(12) United States Patent
Strauss et al.

(10) Patent No.: US 10,949,397 B1
(45) Date of Patent: Mar. 16, 2021

(54) DATA LOCKING AND STATE MANAGEMENT ON DISTRIBUTED STORAGE SYSTEMS

(71) Applicant: Amazon Technologies, Inc., Seattle, WA (US)

(72) Inventors: Jacob A. Strauss, Boston, MA (US); Matteo Frigo, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 827 days.

(21) Appl. No.: 14/568,002

(22) Filed: Dec. 11, 2014

(51) Int. Cl.
*G06F 16/176* (2019.01)

(52) U.S. Cl.
CPC .................. *G06F 16/1774* (2019.01)

(58) Field of Classification Search
CPC ........... G06F 17/30171; G06F 16/1774; G06F 12/1408; G06F 2211/009; G06F 11/203; G06F 15/17331; G06F 2201/805; G06F 2212/154

See application file for complete search history.

(56) References Cited

U.S. PATENT DOCUMENTS

| | | | | |
|---|---|---|---|---|
| 5,444,780 A * | 8/1995 | Hartman, Jr. | ....... | G06F 12/1408 380/30 |
| 6,192,408 B1 * | 2/2001 | Vahalia | ............... | G06F 16/1774 709/229 |
| 6,775,703 B1 * | 8/2004 | Burns | ................. | G06F 12/0866 709/223 |
| 7,028,300 B2 * | 4/2006 | Goldick | .................... | G06F 9/52 707/999.001 |
| 7,124,131 B2 * | 10/2006 | Guthridge | ........ | G06F 17/30171 |
| 7,194,467 B2 * | 3/2007 | Holland | ............ | G06F 17/30171 |
| 7,239,605 B2 * | 7/2007 | Dinker | ............... | H04L 41/0663 370/216 |
| 2002/0152214 A1 * | 10/2002 | Muntz | ............... | G06F 17/30067 |
| 2003/0093672 A1 * | 5/2003 | Cichowlas | .............. | G06F 9/468 713/168 |
| 2004/0078360 A1 * | 4/2004 | DeFauw | .......... | G06F 17/30362 |
| 2004/0220931 A1 * | 11/2004 | Guthridge | ........... | G06F 16/1774 |
| 2008/0134347 A1 * | 6/2008 | Goyal | ................. | G06F 21/6209 726/29 |
| 2009/0254555 A1 * | 10/2009 | Balakrishnan | .......... | G06F 9/455 |
| 2011/0283351 A1 * | 11/2011 | Hudson, Jr. | ............. | H04L 63/10 726/14 |
| 2012/0143999 A1 * | 6/2012 | George | ............... | G06F 12/0815 709/219 |
| 2013/0276067 A1 * | 10/2013 | Goyal | ................. | G06F 21/6209 726/4 |

(Continued)

*Primary Examiner* — Angelica Ruiz
(74) *Attorney, Agent, or Firm* — Davis Wright Tremaine LLP

(57) ABSTRACT

Techniques described and suggested include systems and processes for handling data and client lock management in multi-tenant storage systems, such as distributed storage systems. In some embodiments, data lock and client lock records are stored in connection with a plurality of data stores on which client data resides. In some embodiments, a storage hub operably connected to the data stores determines and retain client lease information. In some embodiments, the client lease information is used in conjunction with the data lock and client lock records to effect and determine the validity of locks on various data elements.

20 Claims, 8 Drawing Sheets

(56) References Cited

U.S. PATENT DOCUMENTS

2014/0189808 A1\* 7/2014 Mahaffey ............ H04L 63/0853
  726/4
2015/0199373 A1\* 7/2015 Mason .................. G06F 16/182
  707/692

\* cited by examiner

DATA LOCKING AND STATE MANAGEMENT ON DISTRIBUTED STORAGE SYSTEMS

BACKGROUND

Data storage and access requirements are increasing rapidly over time. As consumers and enterprises increasingly rely on access to increasing quantities of data via various methods of access, storage systems are increasingly moving to a distributed model. Various protocols have been developed, and are in widespread use today, to enable clients to access data stored remotely such as on networks, thereby enabling such clients access to greater performance and storage capabilities than would generally be possible in a local, or non-distributed model. An example of such protocols includes the Network File System (NFS) protocol, which addresses the basic requirements attendant to multi-tenant environments wherein multiple clients are capable of accessing a shared subset of files and/or storage resources.

However, as storage systems become more distributed, they are also becoming increasingly abstracted. For example, data stored upon a distributed system may exist at a level that is several layers of abstraction from a given client or client access point. Such a distributed storage system may include a plurality of storage servers, upon which data may be flexibly replicated and to which a given client only has indirect access. In such systems, multiple access points to the data may be necessary so as to appropriately balance a large number of incoming client storage requests. However, complications arise when multiple clients attempt to lock a given piece of data, such as a file, when multiple client access points exist, e.g., for the requested data. Examples of such complications include client lock conflicts, a lack of synchronization between client access points, and the like.

BRIEF DESCRIPTION OF THE DRAWINGS

Various embodiments in accordance with the present disclosure will be described with reference to the drawings, in which.

DETAILED DESCRIPTION

Figure 1:
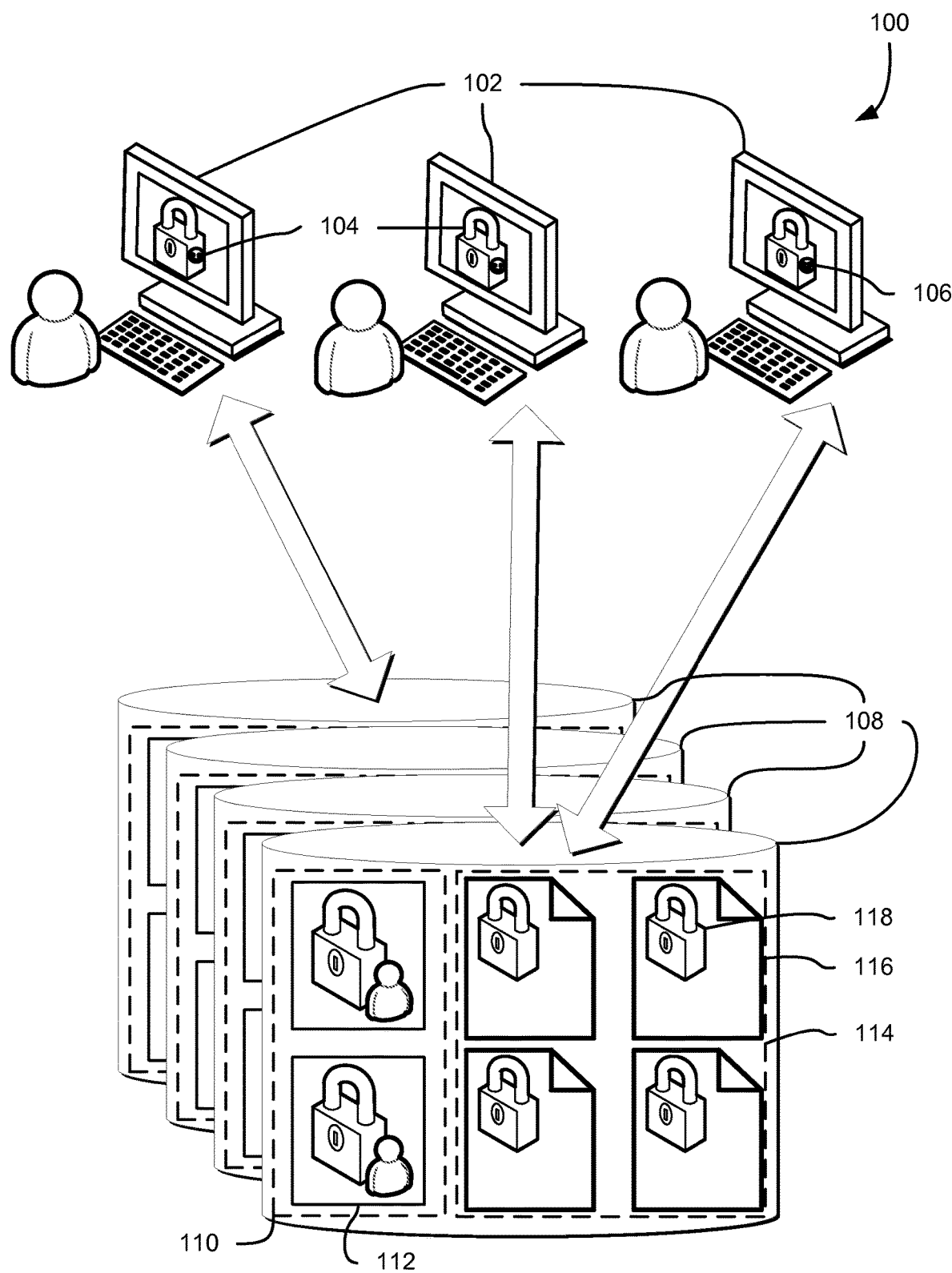
FIG. 1 schematically illustrates a multi-tenant environment in which a data storage provider may implement various data locking mechanisms, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include systems and processes for handling data and client lock management in multi-tenant storage systems, such as distributed storage systems. For example, clients connecting to a distributed storage system may obtain leases to access the distributed storage system for a predetermined length of time, after which the lease is expired without further input from the client. Such leases may be stored and tracked using, for example, a storage hub within (or in conjunction with) the distributed storage system. The storage hub may be one of a plurality of other storage hubs within the distributed storage system. Each storage hub may be operatively connected to a plurality of data stores, such as block-based data storage devices or servers, upon which client data is stored and/or replicated.

As previously described, the storage hub or hubs may store information related to client leases. The data stores may be capable of persisting client lock state records, which may include a manifest or list of all files (or other data elements) to which a given client has a lock. Each data store may further include data lock state records, which provide a converse set of information to that of the client lock state records, i.e., identifying the client to which a given element of data has been allocated and locked. Upon receiving a data lock request from a client, a storage hub may first check the requested data for a data lock state record to determine whether any client has a previously or presently active lock on the requested data element, and if so, the identity of the client holding the lock. In the event that no data lock state record exists for the requested data, a new data lock state record may be written to the data store in association with the requested data, thereby marking the requesting client as the most recent locking entity for the data. In the event that a data lock state record does exist for the requested data, the data lock state record is processed to determine which other client has a lock on the requested data.

The storage hub may determine the validity of any lease the previously locking client holds. If the identified existing client has a current and valid lease, the data lock request from the requesting client is denied. If the existing client's lease is expired or invalid, the system proceeds to overwrite the data lock state record to reflect the new lock state of the data, i.e., to allocate a lock for the requested data element to the new requesting client. The client lock state record may also be updated to reflect that the client now has a lock to the requested data. If no such client lock state record already exists, e.g., the client is a newly instantiated client, the client lock state record will point to the requested data as the first entry. If the client lock state record already exists, however, the identification of the newly locked data is appended to the existing client lock state record.

FIG. 1 schematically illustrates various data locking management workflows in a multi-tenant distributed storage system, in accordance with some embodiments. In some embodiments, a plurality of clients 102 submit data lock requests 104 and 106 to a distributed storage system having a plurality of data stores 108. Data lock requests are, in some embodiments, a communication to a system, such as through an operating system running thereon, to lock a file, a byte range of a file, an address range within an extent, or any other definable data element to one client at any given time. Data lock requests may be in any appropriate format and conform to any protocol appropriate for the implementing system. For example, a data lock request may conform to the Network File System (NFS) protocol. Other examples include conformance to locking mechanisms associated to operating systems such as Microsoft Windows, Unix-like operating systems (such as Linux and Apple OS X), and the like. Locks restrict or prevent access, such as write access, to a file or other data element by any other client or entity other than the client holding the lock. In some embodiments, a lock prevents both read and write access to a locked data element, and in other embodiments, only read or write access is prevented. In some embodiments, the type of access prevented by a lock is configurable, and in some of such embodiments, may be dynamically determined based on one or more attributes associated with, for example, the locking client, an interceding client attempting to access the data element, or both.

As illustrated, some of the data lock requests are successful 104 and some are denied 106. As may be contemplated, the successful requests may be the result of the data having no existing lock associated thereto. Data lock requests that are denied 106 may be denied as the result of a preexisting lock on the requested data that is unable to be cleared or, in some embodiments may be the result of a lack of synchronization between various data stores of the distributed storage system.

The clients 102 may include any entity capable of connecting to, and requesting data from, a distributed storage system. Examples include servers, work stations, and other physical computing devices, virtual computing systems, such as those provided by a computing resource service provider, smart phones, tablets, third party services programmatically interacting with the distributed storage system, internal services requiring an instance or other computing resources of a distributed storage system, and the like. Virtual computing systems may include hardware resources of a computing resource service provider that, upon request, allocates hardware resources to the virtual computing systems, and provides programmatic management of the virtual computing systems to a requestor. Data stores 108 may include any entity capable of storing data and persisting related information, such as other data and metadata, in association with the stored data. Examples include physical storage devices such as hard drives and solid state devices, virtual storage devices, databases, network attached storage units, storage servers, and the like.

In some embodiments, data stores include storage space allocated as a client lock state repository 110, which in turn contains one or more client lock state records 112. In some embodiments, the client lock state records 112 are stored on a per client basis, and list or contain entries for each data element to which the given client has a lock on that data store. In environments where data stores replicate information, e.g., redundantly, it may be appreciated that a given client-data lock relationship may exist on more than one data store by virtue of the data simultaneously existing on more than one data store. Although illustrated as being stored on the same data store as client data, it is contemplated that the client lock state repository, and therefore the client lock state records, may be persisted on a separate data store that is associated with the data store storing the client data. In some embodiments, the client lock state records (and/or the client lock state repository) may be transiently stored, rather than persisted, on an entity capable of temporarily storing data. For example, the client lock state records and/or the client lock state repository may be transiently stored, and may, in some embodiments, be generated (and subsequently) discarded on demand (e.g., as a result of, or on a request of, a specific action, such as a client- or data element-specific lookup).

In some embodiments, the data stores 108 include one or more data repositories 114 capable of storing data elements 116. The lock state of each data element 116 is reflected in some embodiments, in one or more client lock state records 118 associated with each of the data elements 116. In the case that the data store is a block-based data storage device, the data repository may consist of an allocated portion of the data store comprising one or more extents of blocks allocated for client data storage. Data elements 116 may, in some embodiments, include files. While the focus of this disclosure is on files and related types of data elements, data elements may also include file systems, arbitrary data blobs, sparse bundles or sparse files, and other data container types storable within a data store, e.g., one that is block based. The data lock state record 118 may, in some embodiments, be stored in sequence or adjacent to the stored data element 116. For example, in embodiments where the data store is a block-based data storage device, the data lock state record may be written in a reserved area of the address sequence adjacent to the data element to which it applies. In some embodiments, the data lock state record 118 includes an identification of the client presently holding a lock to that data element. In some embodiments, the data lock state record 118 may reflect the last known client to lock the data element. However, in some embodiments, the data lock state record is not updated until a different client requests, and supersedes, a previously granted lock. In other words, in such embodiments, the release of a lock by a given client may not necessarily remove or otherwise modify the client lock state record reflecting that client's lock on the data element.

At a time after receiving a data lock request 104, 106 from one or more clients 102, either directly or indirectly (e.g., through one or more storage hubs), a check for a requested associated data lock state record 118 is made to determine whether a preexisting lock exists to the requested data element. If no data lock state record 118 exists for the requested data element, a new data lock state record 118 is written in association with the requested data element 116 to reflect the requesting client as the holder of the current lock. In addition, in some embodiments, the client lock state record 112 is updated to add the identification of the data element 116 to the list of data elements to which the requesting client presently has a lock. If, upon a data lock request, a data lock state record 118 is determined to exist for the requested data element 116, the data lock state record is processed to determine the identity of a client to which the data element is presently locked. In some embodiments, the previous lock client is queried or its state otherwise accessed (e.g., in accordance with various lease determination techniques described above and below herein). If the previously locking client is found to be invalid or expired, with a new client presently requesting a lock on the data is granted the lock, e.g., by writing the appropriate information to the associated data lock state record. If the previously locking client is valid, however, the new data lock request is denied and, in some embodiments, the denial is reported back to the requesting client. In some embodiments, if either the client lock state record or the data lock state record was not successfully written, any changes made to one or the other are reversed and the requesting client is notified as to the failure in processing its data lock request.

Figure 2:
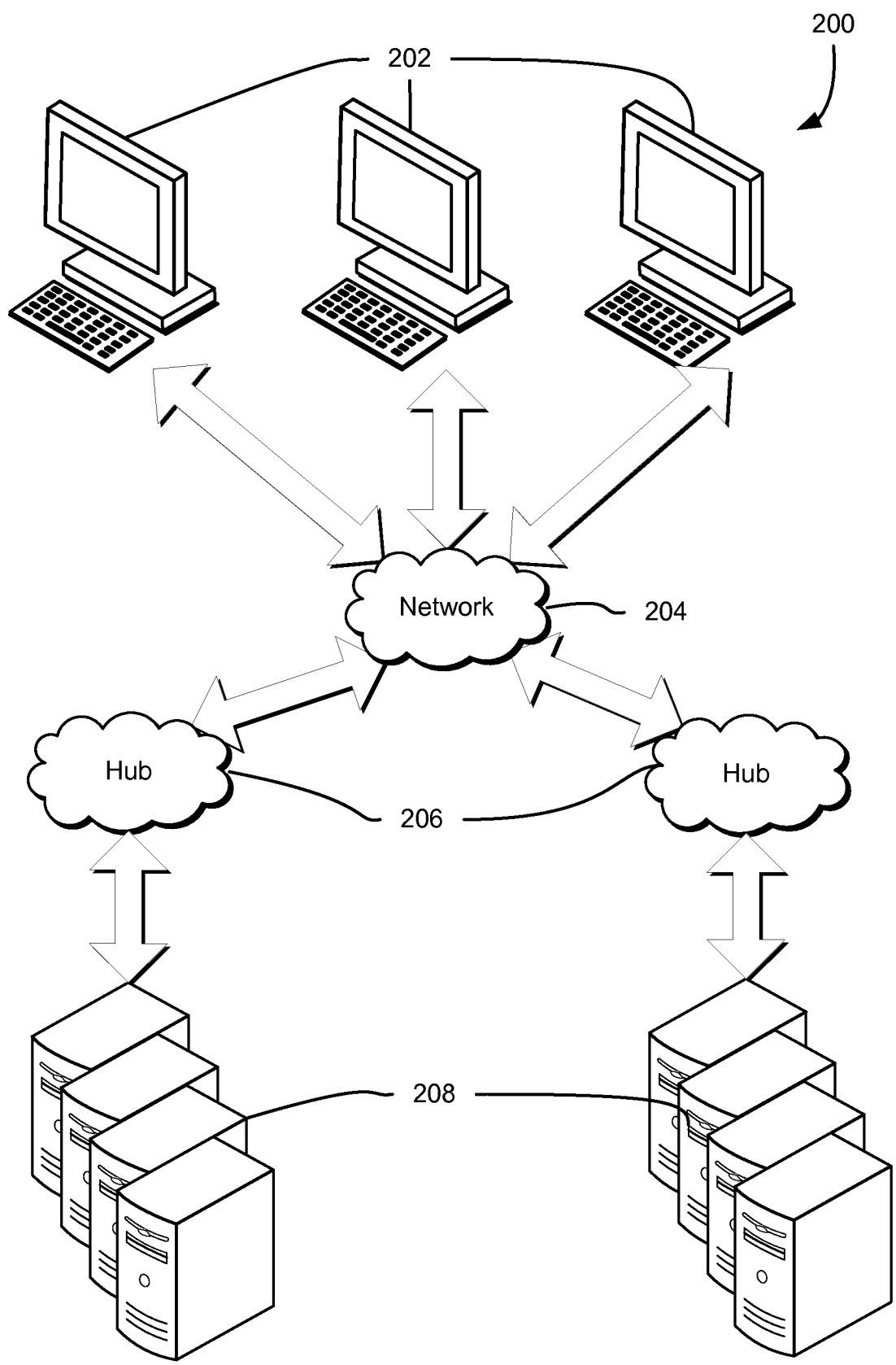
FIG. 2 schematically illustrates an example environment, such as that of a data storage provider, in which various data locking techniques may be implemented, in accordance with some embodiments.

FIG. 2 schematically illustrates a multi-tenant environment 200 in which the various data locking and client management routines described herein may be implemented, such as on a distributed storage system, in accordance with some embodiments. Clients 202 which, in some embodiments, may be similar to the clients 102 described in connection with FIG. 1 above, may connect through network 204 to one or more of a plurality of storage hubs 206. Each storage hub 206 is operably connected, e.g., through an internal network or other appropriate method, to a plurality of data stores 208. The data stores 208 may in some embodiments be similar in functionality to the data stores 108 described above in connection with FIG. 1. For example, some or all data stores 208 may be storage servers. The network 204 may be any appropriate network for connecting the clients 202 to hubs 206. For example, the network may be the Internet, one or more intranets, secured connections such as VPN tunnels, wireless connections, wide area networks, and the like.

In some embodiments, the clients 102 connect through network 204 to the storage hubs 206 so as to access and manipulate data stored on data stores 208. In some embodiments, the storage hubs 206 and data stores 208 are part of a distributed storage system. In some embodiments, the network 204 includes one or more facilities to distribute requests based on, for example, geographic proximity, load balancing, data request type, and the like. Requests from the clients 202 may thereby be dynamically routed to a selected storage hub 206 based on the outcome of such determinations. The storage hub itself may be any entity capable of interfacing between clients 202 and the data stores 208. For example, the storage hubs may be physical computing systems, virtual computing systems, routers, network appliances, load balancers, and the like. It is contemplated that the storage hubs 206 may load balance requests received via network 204 from the clients 202 between the various data stores 208 under its control.

The storage hub may track, as previously discussed, leases by one or more of the clients 202 to sessions or connections to the distributed storage system to which the storage hub 206 belongs, such as by creating and manipulating lease records documenting the leases. In some embodiments the storage hub may also provide a control plane for the data stores 208 under its control, such as to implement redundancy schemes, perform back-up tasks, provide monitoring services, and the like. In some embodiments, the storage hubs 206 may also provide programmatic access, such as through an application programming interface (API), to various functionality provided by the storage hub 206, or to the data stored on the data stores 208. Such data may, in some embodiments, include the data elements 116, the client lock state records 112 and the data lock state records 118 described above in connection with FIG. 1. In some embodiments, the storage hub 206 may generate and/or temporarily or permanently store records such as the client lock state records 112, as described in further detail elsewhere in this disclosure.

Figure 3:
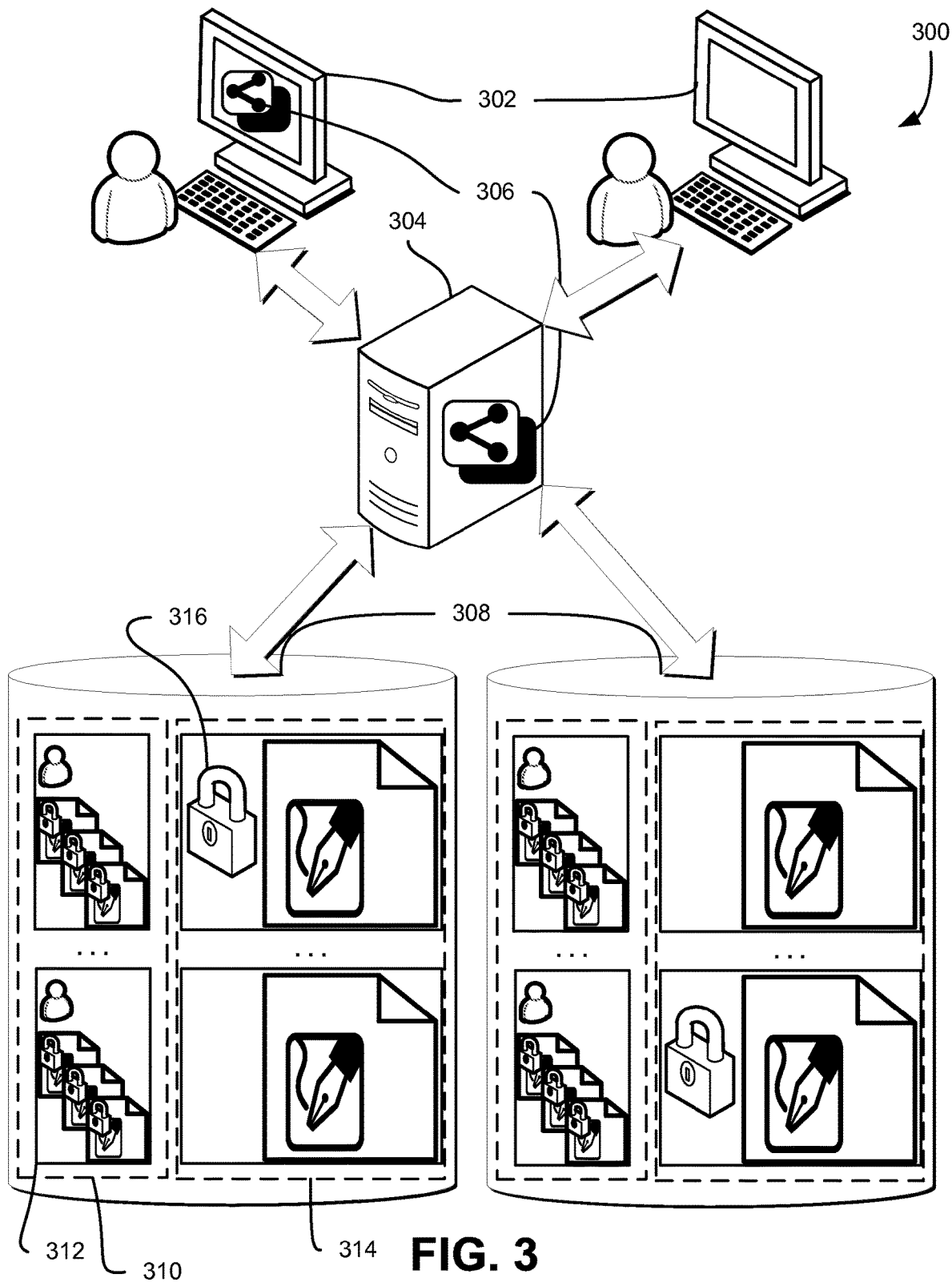
FIG. 3 schematically illustrates various data locking and client management techniques and schemes for use in multi-tenant and distributed storage environments, in accordance with some embodiments.

FIG. 3 illustrates various workflows 300 for client and data lock management on systems having a plurality of data stores, such as distributed storage systems. Clients 302 may, in some embodiments, connect to one or more storage hubs 304, so as to obtain leases 306 for further connecting to data stores 308. The clients 302 may, in some embodiments, be similar to the clients 102 and the clients 202 described above in connection with at least FIGS. 1 and 2. The storage hub 304 may, in some embodiments, be similar to the storage hub 206 described above in connection with FIG. 2. For example, the storage hub 304 may be one of a plurality of storage hubs in a distributed storage system. In some embodiments, as previously discussed, the storage hub 304 may reside on, be implemented by, or comprise any entity capable of providing access to data stores 308, for example, an application programming interface (API), to the clients 302. The storage hub 304 may be a physical computing system, a virtual computing system, such as one provided by a computing resource service provider, a network attached device such as a network attached storage device, a router, a network processor, and the like, as discussed above in connection with at least FIG. 2. The storage hub 304 may, in some embodiments, include one or more databases or other entities capable of storing lease records 306.

As illustrated, at a time after connecting to the storage hub 304, a client 302 that successfully negotiates a connection is, in some embodiments, granted a lease. A lease is, in some embodiments, an authorization to interact with a granting authority, such as a storage server. Leases may be revoked, and therefore be rendered invalid, on the action of the granting authority. In some embodiments, the lease 306, is granted to the connecting client 302 for a predetermined period of time. For example, a storage hub 304 may implement a policy wherein an initial lease 306 granted to a client 302 is valid for a fixed length of time prior to automatically expiring. In some embodiments, the storage hub 304 may renew the lease 306 granted to the client 302 if the storage hub 304 determines that the client 302 remains actively connected to the storage hub 304. For example, the storage hub 304 may require the connecting client 302 to periodically, or, in certain embodiments, upon demand, provide a "heartbeat" signal, a lease renewal, or other acknowledgement that the client 302 is presently active.

If the lease is allowed to expire, such as if a heartbeat or other acknowledgement is not received within a predetermined length of time, the lease is considered invalid, and the client can no longer interact with the storage hub without procuring a new lease. While the present disclosure focuses on leases with predetermined expiration times, it is contemplated that other mechanisms to handle client-to-storage hub connections and sessions may be implemented within the scope of the techniques described herein. As one example, a storage hub may automatically determine, based on traffic flowing to and from the connected client 302, whether the client 302 is still actively connected to the storage hub 304 to, for example, transact data to and from the data stores 308. In this example, a leasing scheme may be implementable without requiring the client 302 to submit an acknowledgment (such as a heartbeat) to storage hub 304. Additionally, in some embodiments, if the storage hub 304 is unavailable or not operational, an implementing system may consider that some or all leases tracked by the storage hub 304 may be considered invalid, and furthermore, the data elements associated with the respective clients may be considered to be unlocked (or lockable) by other clients.

The data stores 308 may, in some embodiments, be similar to the data stores 108 and the data stores 208 described above in connection with FIGS. 1 and 2 respectively. As previously discussed, the data stores 308 may be any entity or a combination of entities capable of storing and transacting data, for example, through a storage hub 304 in transit to and from the client 302. Also as previously discussed, examples of such entities include storage servers, network attached storage devices, physical computing systems, virtual computing systems, databases, physical devices such as hard disk drives and solid state drives, and the like.

In some embodiments, a plurality of data stores 308 is implemented so as to redundantly store client data thereon. Data stored on the data stores 308 may, for example, be replicated across the plurality of data stores 308 so as to improve durability, availability, and or access performance of the data stored thereon. For example, durability may be improved by implementing mirroring, redundancy coding, and other techniques for insuring that a failure of a number of data stores will not destroy the data replicated thereon. Availability may be improved by, for example, parallelizing access to data stored on multiple data stores such that temporary or permanent disablement of a subset of the data stores does not interrupt access to the data replicated thereon. Replication may improve access performance by, for example, increasing parallelism or load capacity such that access latency is decreased, input/output throughput (e.g., number of IOPS) is increased and/or steady state bandwidth (e.g., sequential read and write performance) is increased. Therefore, replication may have multiple benefits, and may be implemented using any appropriate method to improve some or all of the above mentioned parameters. As previously described, such methods may include mirroring, redundancy coding, and the like.

As previously mentioned, the data stores 308 may be capable of having multiple areas, or "buckets" allocated thereon for use in storing various types of records and data elements. For example, data stores 308 may, in some embodiments, include block-based data storage devices. In some embodiments, the data stores 308 include client lock state repositories 310 containing, and/or capable of storing, client lock state records 312. In some embodiments, the data stores 308 include data repositories 314 capable of storing data elements, such as files, volumes, file systems, sparse bundles, and sparse files, and arbitrary data blobs, and as well as data lock state records 316 associated with each data element stored thereon. In some embodiments, the client lock state repository may include an extent of blocks allocated for storing the client lock state records 312. In some embodiments, similarly, the data repository 314 may include extents of blocks allocated for storing the data elements as well as the data lock state records 316. Such extents may include, for example, an allocation of one or more blocks of the data store so as to provide a uniform device mapping at an abstraction level higher than that of the data store itself. Although the client lock state repositories 310 and client lock state records 312 are illustrated in FIG. 3 as being stored on the data stores 308, as previously mentioned, it is contemplated that in some embodiments, the client lock state repositories 310 and client lock state records 312 may be stored elsewhere, such as on the storage hub 304. In some embodiments, the storage of client lock state repositories 310 and/or client lock state records 312 may be temporary (e.g., ephemeral).

For example, extents may be a contiguous set of storage blocks allocated for a given data container, and may be defined in the manner appropriate to the implementation period. For example, an extent may be defined by identifiers as well as the start point and end points or length (e.g., block address, offset, etc.) of the address range allocated on the data store. Extents may provide secondary mappings to, for example, enable computing entities, such as clients 302 and storage hub 304, to address data locations within a given extent without needing to define the physical location of such data on the data store. As with data generally, extents may be replicated on a plurality of the data stores 308 so as to improve the durability, availability, and/or access performance of data stored thereon.

In some embodiments, the client lock state repository 310 includes one client lock state record 312 for each client holding a lock to a data element, such as the data elements stored within the data repository 314 on the data stores 308 on which the client lock state repository 310 resides. In some embodiments, clients lock state records 312 are created when a client presently having no locks to data stored on the data stores 308 successfully negotiates a new lock to a data element stored thereon. In embodiments where a given client 302 has existing locks for data elements resident on the data store 308, any data elements newly locked to the client 302 are identified, and such identifications are appended to the existing client lock state record 312. The client lock state records 312 may, in some embodiments, have a one to one relationship for a client on that given data store 308. By way of example, a given client 302 may only have one client lock state record 312 for all data elements resident on that data store 308 to which the given client 302 presently has a lock. Such client lock state records may identify clients and data elements in any appropriate fashion. For example, a client may be identified using a unique identifier, and may also include an identification of various characteristics of a current or past lease for that client 302. As another example, data elements may be identified by the extent on which the data element is stored, starting and ending block numbers or other address ranges for the data in question, file name, checksums for the data, and the like.

The data repository 314, as previously discussed, may include data elements as well as data lock state records 316. In some embodiments, data lock state records are written to a space on the data stores 308 adjacent to that of the data element. For example, a given file may be stored within an extent and a specific portion of the extent on an adjacent block may be reserved to store a client lock state record 316 relating to that file. The client lock state record identifies, in some embodiments, whether the data element is locked, and if so, the identity of the client 302 holding the lock. In some embodiments, newly created data elements may have no associated data lock state records 316 upon initial commit.

At a time after a client successfully achieves a lock to the data element, the data lock state record 316 is written in the designated space for that data element. In some embodiments, if a client no longer holds a lock to that data element, the data lock state record may still reflect that the data element is locked to the previously locking client. For example, as discussed above, a client 302 may no longer hold a valid lease 306, thereby rendering any locks it held invalid, or as another example, the client 302 may specifically unlock the file. In such embodiments, other techniques to determine the state of a given lock based on the data lock state record may use the data lock state record as a proxy to determine the lock state of the associated data element. For example, if a new client 302 requests a lock on a data element for which a data lock state record 316 indicates an older client having a lock to that data element, the storage hub 304 may use the information in the data lock state record to first determine the identity of the older client 302 and thereon to determine the viability of the older client, for example, by accessing the validity of any lease granted to that older client. In such an example, the content of the data lock state record is used for the determination, but the information within is not considered authoritative. If the lease to the older client is determined to be invalid or nonexistent, the data lock state record 316 is overwritten to reflect the new client as the current holder of the lock to the requested data element. However, if it is determined that a previous client 302 identified by the data lock state record as having a lock on the data element is still viable as determined by the storage hub 304, the requesting client is informed of the denial of its request to lock the data element.

In some embodiments, the information contained within the client lock state records 312 may be used to quickly determine the state of any lock held by a given client, without the need for a given storage hub 304 to communicate, for example, with other storage hubs within a distributed storage system. For example, a system inquiring as to the validity of some or all locks held by a given client 302 may merely query the storage hub to cause the storage hub 304 to check the contents of that client's client lock state record 312 and then determine the validity of that clients lease record 306. If the lease record 306 for the client is determined to be invalid, all data locks associated with that client, such as those identified in that clients client lock state record 312 may be deemed to be unlocked for any clients requesting locks to those data elements thereafter. Such assessments of a client's lock state record may occur on request, such as by the client or by third party services, or on an automated basis, for example, so as to periodically perform garbage collection or housekeeping on lock states across a plurality of data stores 308.

As a distributed storage system implementing both client lock state records and data lock state records may, in some embodiments, utilize both of such record types to reasonably accurately reflect lock states, in some embodiments, a given lock requested by a client 302 may not be ultimately successful, and may be reported back to the client as being unsuccessful, if both the data lock state record and the client lock state record applicable to the request are not appropriately or successfully updated. In such embodiments, a successful action such as writing to one of the client lock state record or the data lock state record is reversed if the other action does not successfully occur, thereby effectively leaving the lock state in question unchanged. While this disclosure focuses on data stores containing both a client lock state repository 310 and a data repository 314, it is contemplated that the client lock state repository 310 may be physically located on a different device or entity than the data store holding the client lock state repository, so long as the respective entities are closely associated.

Figure 4:
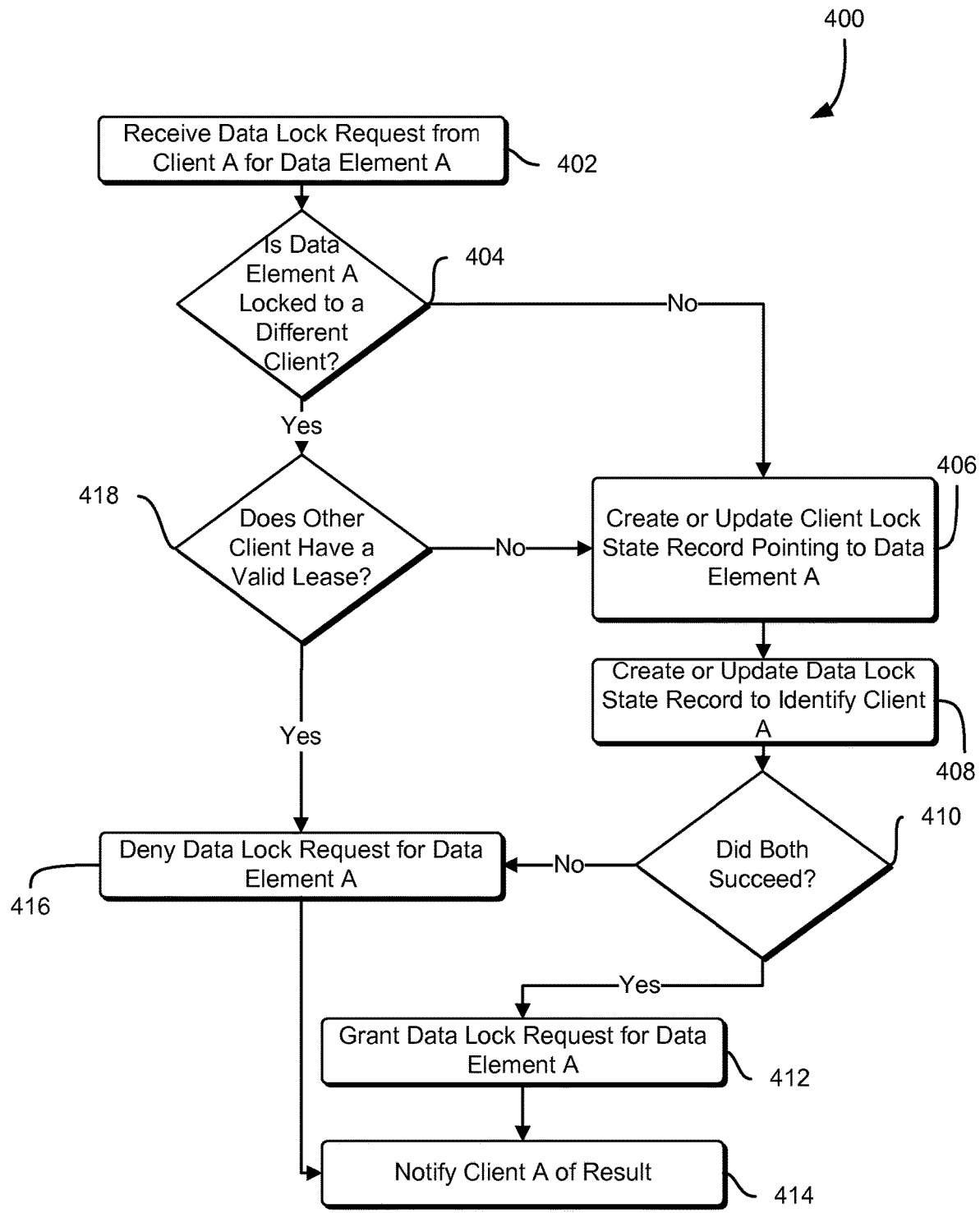
FIG. 4 schematically illustrates a process for processing data lock requests in accordance with some embodiments.

FIG. 4 schematically illustrates an example process 400 for processing data lock requests for data elements stored upon a distributed storage system, in accordance with some embodiments. The process 400 may be performed by various components of a distributed storage system and implemented using workflows depicted and described in connection with FIG. 1 above, implemented on environments such as the environments pictorially described above in connection with FIGS. 2 and 3, or on any distributed storage system having a plurality of data stores upon which data elements are stored.

At step 402, a data lock request is received, e.g., by the storage hub, such as the storage hub 206 or the storage hub 304 described above in connection with FIGS. 2 and 3, from a given client for one or more data elements, illustratively enumerated as client A and data element A, respectively. The data lock request may come from a client such as the clients 102, 202 or 302 described above in connection with FIG. 1, FIG. 2 and FIG. 3, respectively. At decision point 404, the lock status of data element A is assessed. For example, a storage hub, such as the storage hub 206 or the storage hub 304 described above in connection with FIGS. 2 and 3, respectively, determines whether the data element A at issue in the request of step 402 is presently locked and, if so, to which client the data element A is locked. If the data element A is determined to not be locked (e.g., lockable with respect to the requesting client), a client lock state record is either created or updated, e.g., by a data store such as data store 108, 208, or 308, based on the preexistence of a client lock state record, for the requesting client, and is set to at least point to data element A. For example, if the client has no present client lock state record, such as the client lock state record 312 described above in connection with FIG. 3, a new client lock state record is generated by the data store. If the client lock state record for the client A exists, however, the existing client lock state record is merely updated, e.g., by the data store, to include a pointer to data element A. In some embodiments, when the data element A is determined to be lockable, a temporary hold or lock may be placed with regard to the requesting client until some or all of the locking steps in process 400 are complete, so as to prevent other clients from placing a competing or intervening lock (thereby preventing, for example, a race condition).

Thereafter, at step 408, a data lock state entry, such as the data lock state entry 316 described above in connection with FIG. 3, is created or updated by the data store so as to identify client A as the locker of the requested data element A. At decision point 410, the outcome of the actions taken in steps 406 and 408 are assessed by the storage hub or the data store. If both the client lock state record and the data lock state record were successfully created or updated, the data lock request originated in step 402 is granted by the data store or storage hub at step 412. For instance, the distributed storage system (e.g., via a storage hub) may grant the data lock request by performing one or more operations that result in the data element associated with the data lock request being locked to the requesting client. For example, the storage hub may access to the locked data element by clients other than the client to whom the lock was granted. At step 414 the requesting client A is notified by an element of the distributed storage system (e.g., the storage hub) of the result of its request to lock data element A. For example, such a result may be provided via a programmatic method, such as through an API, or by any other appropriate method, e.g., either synchronously in response to the data lock request, or asynchronously.

Returning to decision point 404, if the data element A is determined by, e.g., the data store to be locked to a different client, a second decision point 418 is reached. At decision point 418, the validity of a lease, such as by determining the other client to which the requested data element is locked, is determined by the data store or the storage hub by assessing the validity of the other client's lease at decision point 418. For example, the techniques described above in connection with FIG. 3 may be used to assess the validity of a given lease, such as by assessing the validity of the lease record 306, and/or by directly querying the other identified client. In the event that the other client is not determined to have a valid lease, the workflow may resume from step 406, and the requesting client A may proceed to attempt to lock the data element A for itself. If, however, at decision point 418, the other client is determined by the storage hub to have a valid lease, the data lock request to client A for data element A is denied at step 416. Additionally, if one or both of client lock state records and/or the data lock state record created or updated in steps 406 and 408 were not successfully completed, the data lock request for data element A is also denied by the storage hub, as shown at decision point 410 and at step 416. In the event that the data lock request for data element A is denied at step 416, the requesting client A is notified of the failure in step 414. In embodiments where a different client presently holds a lock to data element A, that client retains the lock and the lock status of the data element A is thereby unchanged.

Figure 5:
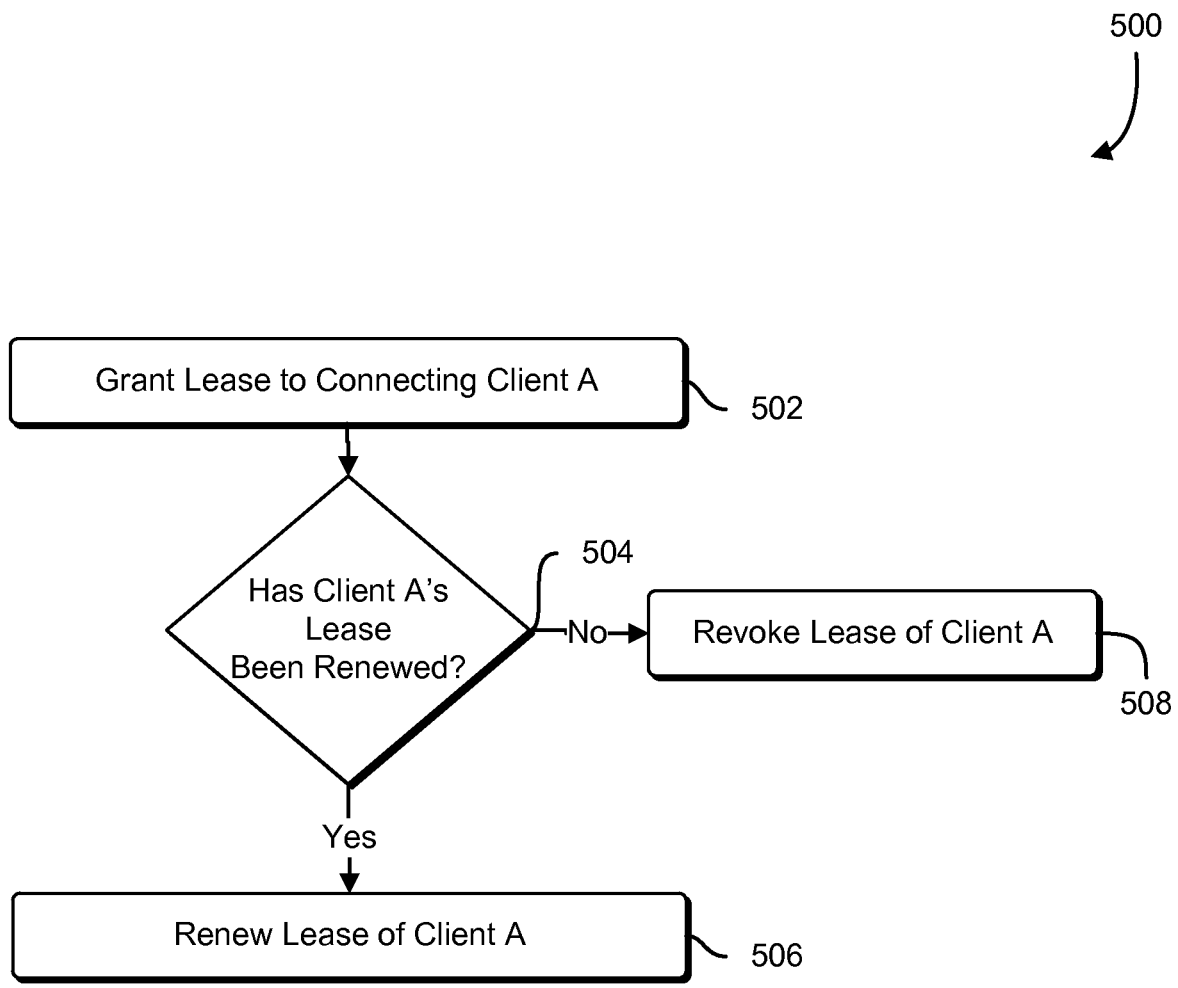
FIG. 5 schematically illustrates a process for handling client leases for distributed storage systems, in accordance with some embodiments.

FIG. 5 schematically illustrates an example process 500 for granting and determining the status of client leases to distributed storage systems, in accordance with some embodiments. At step 502, a client, such as the clients 102, 202 and 302 described above in connection with FIGS. 1, 2 and 3, respectively, connects and is granted a lease during which client A may transact with, for example, the implementing data storage provider or distributed storage system. The details of the lease, such as leases granted in accordance with the techniques described in FIG. 3, may be memorialized in a lease record, such as the lease record 306 described above in connection with FIG. 3. The lease may be granted by a component of a distributed storage system, such as a storage hub 304 to which the client connects and through which the client generally interfaces with the distributed storage system. The storage hub may be similar to the storage hubs 206 and 304 described above in connection with FIGS. 2 and 3.

As described above at least in connection with FIGS. 3 and 4, the lease may be for a predetermined amount of time, after which the lease expires, unless information is received from client A to prevent such expiration. For example, as discussed in connection above with FIG. 3, a client may be required to submit a heartbeat or other acknowledgment that it is still viable on a predetermined schedule, or within a specific time after receiving an acknowledgment request, such as from a storage hub. At decision point 504, viability information, such as a lease renewal or heartbeat, is used by, e.g., the storage hub to determine whether client A has been active within a predetermined time frame. If no such information, such as a lease renewal or heartbeat, is received by the storage hub from client A within the prescribed window of time, the lease to client A is revoked by the storage hub at step 508. In some embodiments, the revocation of the lease prevents client A from transacting additional data or otherwise further interacting with the distributed storage system until a new lease is established. However, in the case that a heartbeat, lease renewal, or other viability information is received from client A during the prescribed time frame, the lease to client A may be renewed by the storage hub at step 506. As previously described above, for example in connection with FIGS. 3 and 4, a lease may thereby be indefinitely extended or renewed at step 506 so long as the required heartbeat or other viability information is received by the storage hub on a timely basis from client A.

Figure 6:
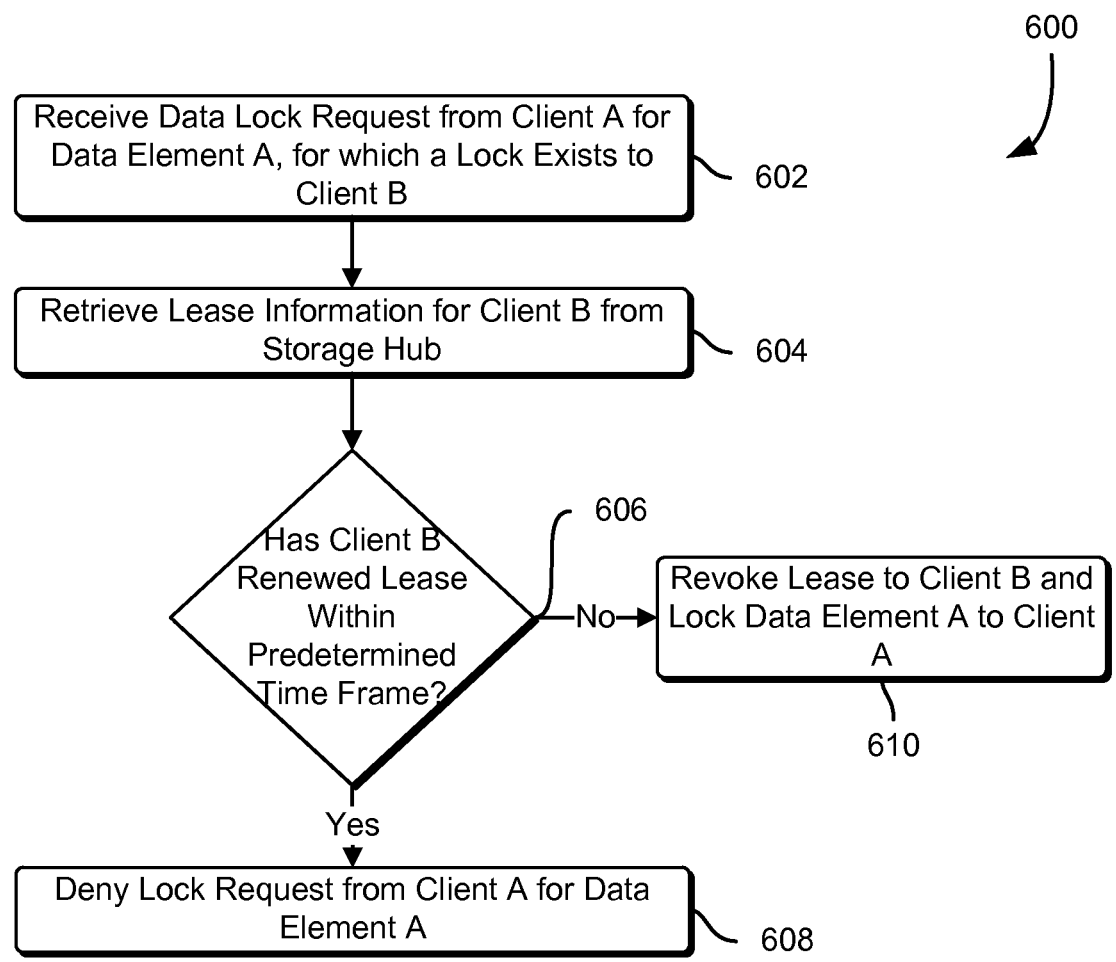
FIG. 6 schematically illustrates an example process for processing data lock requests for data with pre-existing locks, in accordance with some embodiments.

FIG. 6 schematically illustrates an example process 600 for processing data lock requests for data elements where a data lock presently or previously exists for the requested data element to be locked, in accordance with some embodiments. At step 602, a data lock request is received by a storage hub from a first client, denoted here as client A, for a data element, illustratively denoted as data element A, for which a lock currently or previously existed, such as to a second client, denoted as client B. Clients A and B may be similar in functionality to clients 102, 202 and/or 302 described above in connection with FIGS. 1, 2 and 3, respectively. The determination of whether a lock exists for the requested data element A may be in accordance with the techniques previously described, such as those described in connection with at least FIGS. 1, 2, 3, and 4, above.

At step 604, lease records or other information relating to the client to which the lock is determined to exist, such as client B, are assessed by the storage hub. The storage hub may, in some embodiments, be similar to the storage hubs 206 and 304 described above in connection with FIGS. 2 and 3, respectively. If, at decision point 606, a valid lease renewal, heartbeat, or other viability information has been received by the storage hub from client B within the predetermined timeframe, the lease to client B is considered valid and therefore the requested data element remains locked to client B. Such determinations may be performed in accordance with at least the techniques described in connection with FIGS. 3, 4 and 5 above. Thereafter, client A's lock request for data element A is denied by the storage hub at step 608. However, if client B is determined to not be viable, such as due to an absence or invalidity of validity information, such as a that of a lease renewal or a received heartbeat for a predetermined time window, the existing lease to client B is revoked by the storage hub, and the request by client A to lock data element A moves forward at step 610.

Figure 7:
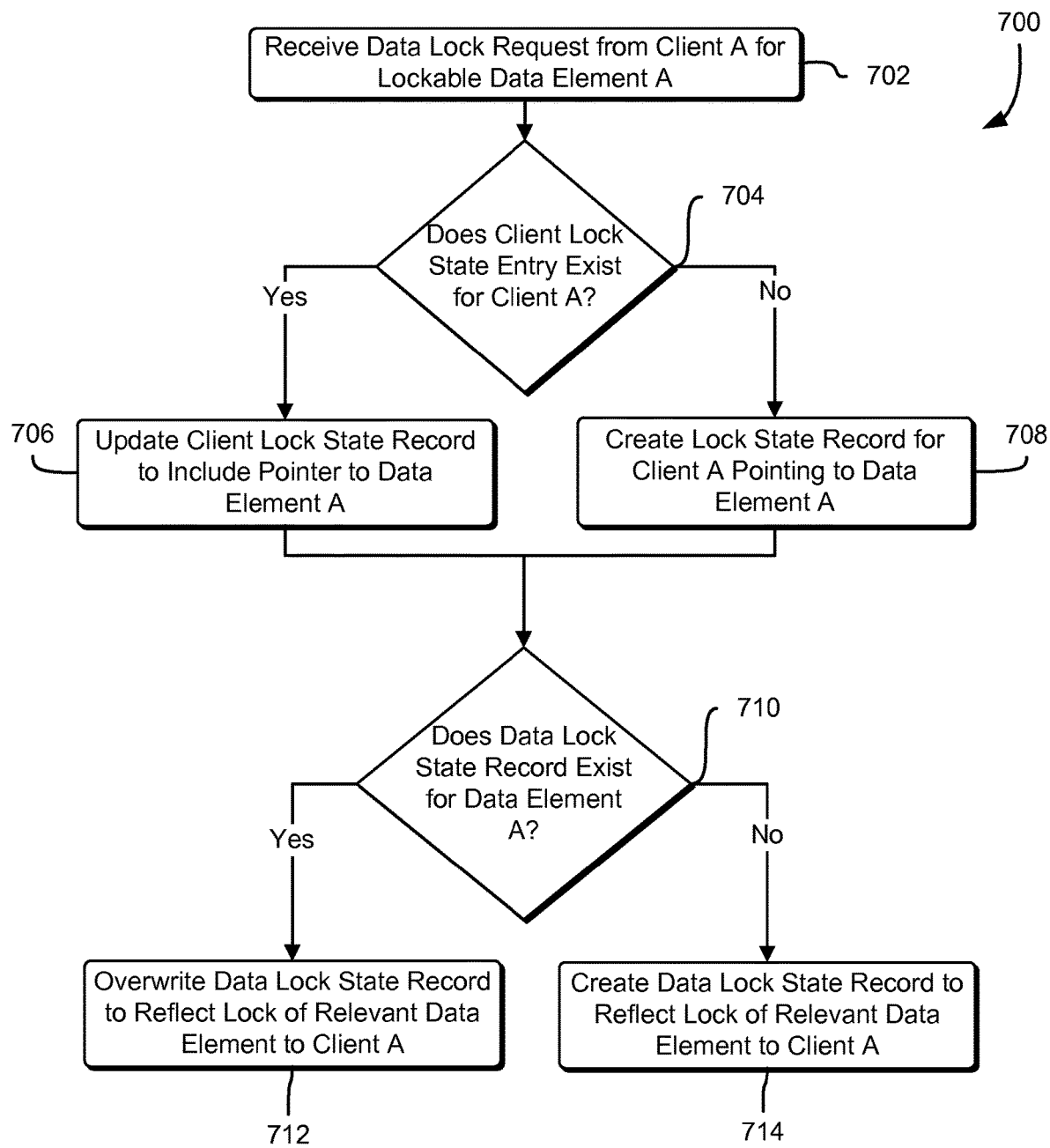
FIG. 7 schematically illustrates an example process for locking data in accordance with a data lock request by updating client lock state records and data lock state records, in accordance with some embodiments.

FIG. 7 schematically illustrates an example process 700 for processing data lock requests for data elements on a distributed storage system that are previously determined to be lockable, in accordance with some embodiments. At step 702, a data lock request is received by a storage hub, such as storage hubs 206, 304 from a client for a data element on the distributed storage system that is determined to be lockable, such as using the techniques described above in connection with at least FIGS. 1, 2, 3, 4 and 6. The client may be similar in characteristics and implementation as the clients 102, 202 and 302 described above in connection with FIGS. 1, 2 and 3, respectively.

At decision point 704, the status and/or existence of a client lock state record for requesting client A is determined by, e.g., the data store. Client lock state records may, in some embodiments, be similar to the client lock state records described above in connection with FIGS. 1 and 3. If such a client lock state record has been determined by the data store to exist for the requesting client, the client lock state record is updated by the data store to include a pointer to the requested data element at step 706. However, if no client lock state record presently exists for the requesting client, a new lock state record is created by the data store for the requesting client A, and a first entry is added pointing to data element A. The client lock state record may include similar information and be stored in a similar fashion as the client lock state records 112 and 312, described above in connection with FIGS. 1 and 3, respectively.

Thereafter, the existence of a data lock state record associated with the requested data element is determined by the data store at decision point 710. The data lock state record may be similar in characteristics and implementation to the data lock state records 118 and 316, described above in connection with at least FIGS. 1 and 3, respectively. If the data lock state record is determined to previously exist for the requested data element, the existing data lock state record (which may reflect another client that no longer has a lock to the requested data element) is overwritten by the data store to reflect the lock of the data element A to the requesting client A at step 712. This action may occur according to techniques described above in connection with at least FIGS. 1, 3 and 4. In the event that the data lock state record for the requested data element A is not determined by the data store to exist at decision point 710, however, a new data lock state record is created by the data store in conjunction with the requested data element A at step 714, so as to reflect the lock of the data element A to the requesting client A. As previously described, such data lock state records may be associated with the requested data element by, for example, being stored in an adjacent area of the data store on which the data element resides to the data element itself.

Figure 8:
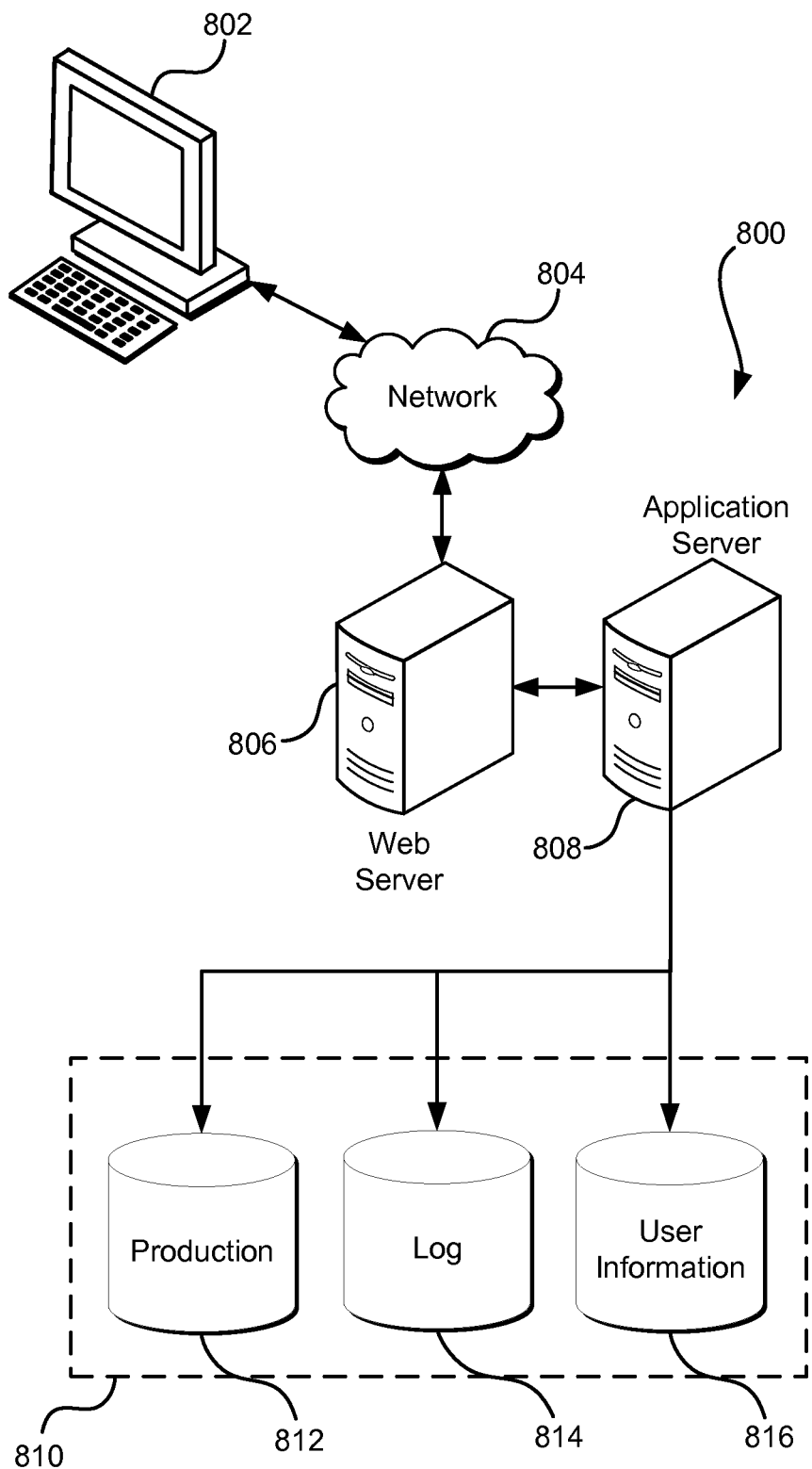
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes an application server 808 and a data store 810. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
generating one or more lease records upon a plurality of storage hubs for a plurality of clients connecting to the plurality of storage hubs, the plurality of storage hubs being operably connected to a plurality of data stores, the one or more lease records:
including information related to connection validity of the plurality of clients; and
providing a first client of the plurality of clients authorization to interact with and to provide a lock request to a data store of the plurality of data stores;
at a time after receiving, from the first client of the plurality of clients, a lock request to lock one or more data elements stored upon the data store of the plurality of data stores:
determining existence of a prior data lock state record that marks the one or more data elements as locked to a second client of the plurality of clients;
at a time when the prior data lock state record that marks the one or more data elements as locked to a second client is determined to exist, determining a lock status of the one or more data elements by at least determining validity of at least one of the one or more lease records associated with the second client; and
at a time after the lock status of the one or more data elements is determined to be lockable based on the one or more lease records associated with the second client, locking the one or more data elements to the first client by:
generating a client lock state record that includes a manifest of data elements locked to the first client, the manifest at least including information relating to the lock status of the one or more data elements; and
storing, upon the data store, a new data lock state record that marks the one or more data elements as locked to the first client.

2. The computer-implemented method of claim 1, wherein:
    determining the validity of the at least one lease record includes determining whether a lease renewal has been received during a predetermined length of time preceding the lock request; and
    wherein the method further comprises, if the lease renewal has not been received during the predetermined length of time, determining that the at least one lease record is invalid.

3. The computer-implemented method of claim 1, wherein the lock status of the one or more data elements is determined to be lockable if the prior data lock state record is determined to exist and marks the one or more data elements as locked to the second client of the plurality of clients, the second client having an invalid lease record stored on at least one storage hub of the plurality of storage hubs.

4. The computer-implemented method of claim 3, wherein the storing of the new data lock state record supersedes the prior data lock state record marking the one or more data elements as locked to the second client.

5. A system, comprising:
    one or more processors; and
    memory including instructions that, when executed by the one or more processors, cause the system to:
        generate one or more lease records that authorize a client of a plurality of clients to interact with and provide a lock request to a data store of a plurality of data stores;
        at a time after receiving, by at least one storage hub of a plurality of storage hubs, a request from the client to lock a subset of data elements stored on the data store operatively connected to a subset of the plurality of storage hubs, determine whether the subset of data elements is available to be locked based on a second lease record from a second client; and
        if the subset of data elements is determined to be available to be locked, lock the subset of data elements by generating information that includes the subset of data elements in a list of data elements locked to the client and identifies the client as holding a lock to the subset of data elements:
        store the list of data elements locked to the client with a client lock status record corresponding to the client; and
        associate the client lock status record with a lease record of the client.

6. The system of claim 5, wherein the instructions, when executed by the one or more processors, cause the system to further:
    if the subset of the data elements is determined to not be available to be locked due to being locked to the second client, evaluate validity of the second lease record of the second client;
    if the second lease record is evaluated to be invalid, further determine the subset of data elements to be available to be unlocked; and
    return, to the client, a response to the request, the response indicating at least a lock status of the subset of data elements.

7. The system of claim 6, wherein the information is generated by at least overwriting previous information identifying the second client as holding the lock to the subset of data elements.

8. The system of claim 5, wherein:
    the generated information relating to the list of data elements is generated as a client lock state record on the at least one storage hub;
    the generated information identifying the client as holding the lock to the subset of data elements is stored as a data lock state record on the data store; and
    the instructions, when executed by the one or more processors, cause the system to further, at a time after determining that both the client lock state record and the data lock state record were successfully created, report the subset of data elements to the client as locked to the client.

9. The system of claim 8, wherein the instructions, when executed by the one or more processors, further cause the system to, at a time after determining that one of the client lock state record or the data lock state record was not successfully created, report the subset of data elements to the storage hub as not locked by the request.

10. The system of claim 5, wherein the data elements are files.

11. The system of claim 5, wherein the data store is a data store of a plurality of data stores associated with the at least one storage hub.

12. The system of claim 5, wherein the data store is a block-based storage device.

13. One or more non-transitory computer-readable storage media having stored thereon executable instructions that, when executed by one or more processors of a computer system, cause the computer system to at least:
    generate one or more lease records that authorize one or more clients of a plurality of clients to interact with and provide a lock request to at least a subset of a plurality of data stores; and
    service lock requests, by at least one storage hub of a plurality of storage hubs that are operatively connected to the plurality of data stores, from the one or more clients connecting to the at least one storage hub, for data stored on at least the subset of the plurality of data stores by at least:
        determining that the requested data is unlocked by at least processing information stored on the subset of data stores relating to the requested data, the information including at least one data lock state record identifying lock status of the requested data and at least one lease renewal status which indicates validity of the at least one data lock state record;
        based at least in part on the requested data being determined to be unlocked, updating the at least one data lock state record stored on the subset of data stores to identify the lock status of the requested data as locked to the clients; and
        associating the at least one data lock state record with a lease record of the one or more lease records.

14. The one or more non-transitory computer-readable storage media of claim 13, wherein the instructions further cause the computer system to read client lock state records associated with the requested data to identify which subset of the clients have locks to the requested data.

15. The one or more non-transitory computer-readable storage media of claim 14, wherein the instructions further cause the computer system to:
    determine whether lease records provided by the storage hub to a subset of clients having data lock state records to the requested data are valid by at least checking lease renewal status, by the at least one storage hub, for the subset of clients within a predetermined length of time; and for the clients of subset of the clients for which the lease renewal status is not verified as valid within the predetermined length of time, determine that the requested data is unlocked.

16. The one or more non-transitory computer-readable storage media of claim 13, wherein the instructions further cause the computer system to service the lock requests by responding to the clients with a status of the lock requests.

17. The one or more non-transitory computer-readable storage media of claim 13, wherein the clients are virtual computing systems of a computing resource provider.

18. The non-transitory computer-readable storage medium of claim 13, wherein the data is redundantly stored on a subset of the plurality of data stores.

19. The non-transitory computer-readable storage medium of claim 13, wherein the storage hub enables application programming interface calls to the data stored on the plurality of data stores.

20. The non-transitory computer-readable storage medium of claim 13, wherein:
   the data is stored as files on the subset of the plurality of data stores; and
   the lock requests contain requests for data comprising at least a portion of the stored files.

* * * * *